(12) United States Patent
Bishop et al.

(10) Patent No.: US 8,489,154 B2
(45) Date of Patent: Jul. 16, 2013

(54) MANAGING PROJECTED POWER OUTAGE AT MOBILE RADIO BASE SITES

(75) Inventors: Peter William Dale Bishop, Purton (GB); Stephen J. Barrett, Thatcham (GB); Ivan David Harris, Bradford on Avon (GB)

(73) Assignee: PowerOasis Limited, Swindon (GB)

( * ) Notice: Subject to any disclaimer, the term of this patent is extended or adjusted under 35 U.S.C. 154(b) by 0 days.

(21) Appl. No.: 13/485,577

(22) Filed: May 31, 2012

(65) Prior Publication Data

US 2012/0302295 A1 Nov. 29, 2012

Related U.S. Application Data

(63) Continuation of application No. PCT/GB2010/002198, filed on Nov. 30, 2010.

(30) Foreign Application Priority Data

Dec. 1, 2010 (GB) .................................. 0921052.7

(51) Int. Cl.
*H04W 52/02* (2009.01)

(52) U.S. Cl.
USPC ...... 455/574; 455/572; 455/127.1; 455/127.5

(58) Field of Classification Search
USPC ............... 455/572, 574, 127.1, 127.5, 343.1, 455/343.2, 343.6
See application file for complete search history.

(56) References Cited

U.S. PATENT DOCUMENTS

| | | | |
|---|---|---|---|
| 2002/0075906 A1* | 6/2002 | Cole et al. ..................... | 370/535 |
| 2006/0182262 A1* | 8/2006 | Goldman et al. ............. | 379/323 |
| 2009/0131102 A1* | 5/2009 | Takahashi et al. ......... | 455/552.1 |
| 2009/0154384 A1 | 6/2009 | Todd et al. | |
| 2010/0100758 A1* | 4/2010 | Houmaidi ..................... | 713/340 |
| 2010/0286841 A1* | 11/2010 | Subbloie ....................... | 700/295 |
| 2011/0140911 A1* | 6/2011 | Pant et al. ................ | 340/870.02 |

FOREIGN PATENT DOCUMENTS

| | | |
|---|---|---|
| EP | 2 083 170 | 7/2009 |
| EP | 2 271 172 | 1/2011 |
| WO | WO 94/22239 | 9/1994 |
| WO | WO 03/098387 | 11/2003 |
| WO | WO 2005/060287 | 6/2005 |
| WO | WO 2009/078764 | 6/2009 |
| WO | WO 2009/141651 | 11/2009 |
| WO | WO 2010/006308 | 1/2010 |

* cited by examiner

*Primary Examiner* — Cong Tran
(74) *Attorney, Agent, or Firm* — Weide & Miller, Ltd.

(57) ABSTRACT

Power management methods are provided for projecting the likelihood of forthcoming power outage at one or more mobile radio base sites and for mitigating the effects of such a projected power outage.

21 Claims, 4 Drawing Sheets

MANAGING PROJECTED POWER OUTAGE AT MOBILE RADIO BASE SITES

PRIORITY CLAIM

This application is a continuation of and claims priority and the benefit of PCT Application No. PCT/GB2010/002198 titled Managing Projected Power Outage at Mobile Radio Base Sites, filed Nov. 30, 2010, which claims priority to and the benefit of Great Britain Application No. 0921052.7 filed on Dec. 1, 2009.

FIELD OF THE INVENTION

The present invention relates to methods for projecting forthcoming power outage at one or more mobile radio base sites and methods for mitigating the effects of the power outage.

RELATED ART

One type of radio communications system is a cellular communications system. In a cellular communications system, the area over which service is provided is divided into a number of smaller areas called cells. Typically each cell is served from a base station which has an antenna or antennas for transmission to and reception from a user station, normally a mobile station and a backhaul connection for routing of communications to and from a fixed base site controller for onward transmission to user terminals or other communications networks. Presently established cellular radio communications systems include Global System for Mobile communications (GSM), Code Division Multiple Access (CDMA), Worldwide Interoperability for Microwave Access (WiMAX), and also the Universal Mobile Telecommunication System (UMTS).

Such base stations and their associated equipment require electrical power to operate. Typically this power has been provided by connection to an electrical grid, or in cases where this is not available through connection to a standalone diesel generator. More recently power generated from renewable means such as wind turbines or photovoltaic (PV) arrays has been used as an alternative or as a supplement to diesel generators for sites without a grid connection. Inclusion of such renewable sources in the power supply mix is attractive because it can reduce or avoid the operational expenditure associated with refueling diesel generators.

By the distributed nature of radio communications systems it is likely that base stations will be operating under differing environmental conditions, will use a variety of power sources (grid, diesel, renewable and hybrid) and may be served by a range of power service providers.

Power supply solutions for mobile radio equipment are distinctive in that they must deliver the required power to the telecommunications equipment with high availability so that the mobile radio network remains operational. Another distinctive feature of mobile radio equipment is that the power drawn by the equipment may be variable over the course of time, with power drawn being dependent for example on the varying volume of telecommunications traffic being carried. In addition the power generated by renewable energy sources will also be variable being dependent on meteorological conditions. Operators of mobile radio equipment and the associated power supply network need to be provided with information to inform them of the risk that mobile radio equipment may need to be switched off over some future period due to a lack of power. An operator could use such information, for example, to expedite the supply of diesel to a site or to actively manage the power drawn by the radio equipment so that radio network capacity/coverage can be provided for longer. Hence there is a need for a network power management solution which integrates knowledge of the projected power which will be generated by the various power sources and knowledge of expected power drawn by the mobile radio equipment in order to compute metrics for the expected time to outage of the Base Transceiver Station (BTS) and/or the backhaul equipment. Such a network power management solution could use this information to mitigate the, effects of such a projected outage.

The existing state of the art solutions do not address these problems. Mechanisms for notifying central management systems of power supply conditions are known, as described for example in EP 1 330 009. Likewise mechanisms for reducing the power consumption of equipment at times of low traffic demand are also known, see for example U.S. Pat. Nos. 6,360,106, 6,584,330. However, these solutions address neither the problem of projecting the time to power outage nor the actions that should be taken given this knowledge.

SUMMARY OF THE INVENTION

The present invention addresses some or all of the above disadvantages. According to one aspect of the present invention, a method is provided for: projecting the likelihood that power outage will occur at a mobile radio base site over some future interval, and in the event that power outage is expected, for, invoking actions to prolong the period for which the mobile radio base station provides service.

The present invention is applicable to, but not limited to, radio communication systems such as the Global System for Mobile communications (GSM), Code Division Multiple Access (CDMA), Worldwide Interoperability for Microwave Access (WiMAX), Universal Mobile Telecommunication System (UMTS) and Long Term Evolution (LTE). The present invention is also applicable to, but not limited to, mobile radio base stations powered by one or more types of power supply including wind turbine, Photo-voltaic panel, generator, grid connection, battery and fuel cell.

Further features of the invention are as claimed in the dependent claims. Additional specific advantages are apparent from the following description and figures which relate to exemplary embodiments of the present invention. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE DRAWINGS

Figure 1:
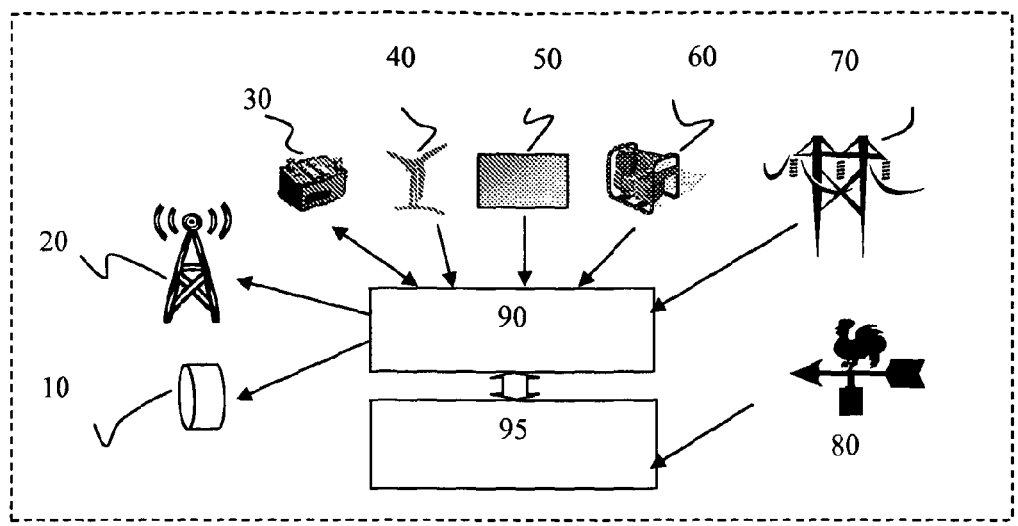
FIG. 1 is an illustration of the power supply and ancillary equipment located at the base station site.

FIG. 1 illustrates the power supply and ancillary equipment located at the base station site. A power supply controller (90) integrates power generated by a number of sources, which may optionally include wind turbine (40), photo-voltaic panel (50), diesel generator (60) and grid connection (70). The generated power is used to charge a battery (30). The power supply controller (90) distributes the power to the base station loads which may include base station (20) and microwave backhaul (10). A communications device (95) supplies information pertaining to the power supply status to a centralized Operational Support System (OSS) and/or to a centralized base station controller. Site specific weather information may be obtained using a weather station (80), this information may also be communicated via the communication means (95).

Figure 2:
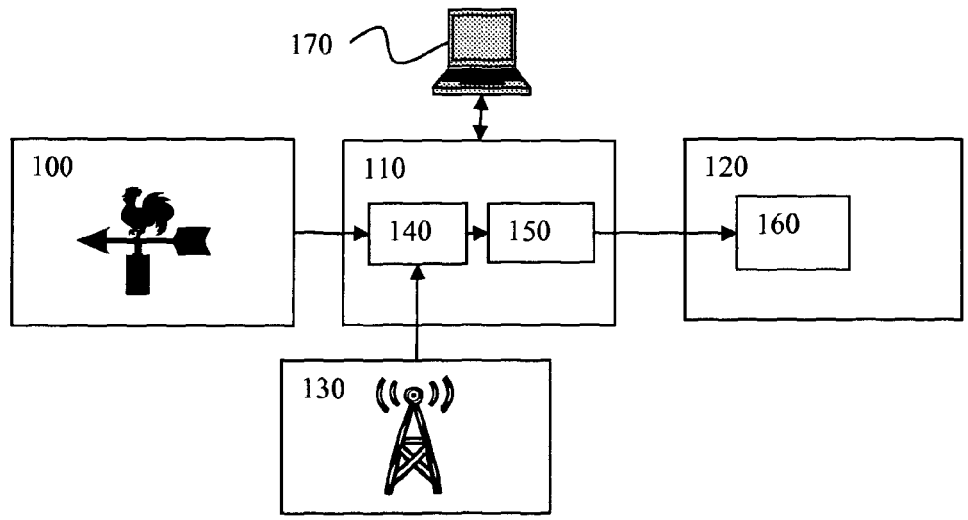
FIG. 2 is an illustration of part of a mobile radio communications network according to an embodiment of the present invention. The figure illustrates one possible implementation by which information may be collated in order to make a projection of the time to likely power outage. The figure also shows in which pieces of equipment the functionality is located for determining and implementing the actions which can be taken in order to mitigate the power outage.

FIG. 2 is an illustration of part of a mobile radio communications network. An Operational Support System (OSS), (110) collates optionally meteorological information from a server (100) along with measurements of mobile radio base site power consumption obtained from a measurement device at the base site (130) and information concerning projected future traffic requirements. A processing function (140) within the OSS uses this information to determine the projected time to power outage. If the time to power outage is less than some pre-determined threshold, say 3 days, then a processing function (150) determines what actions should be taken. An example of one such possible action is that an alarm is raised, such an alarm could be conveyed to an engineer via an OSS terminal (170) or through other means such as by the sending of an SMS or by the sounding of an audio alarm. Such alarm information may be used by the OSS operative to schedule re-fuelling of the diesel tank if there is a generator at the base site. Alternatively, if there is no generator at the site or if refueling is undesirable or not possible for other reasons then the processing function (150) can determine other actions that should be taken to reduce the power consumption of the site and thereby prolong the site's availability. Some of these actions may be carried out by a traffic management function (160) within a Base Site Controller (BSC) (120).

Figure 3:
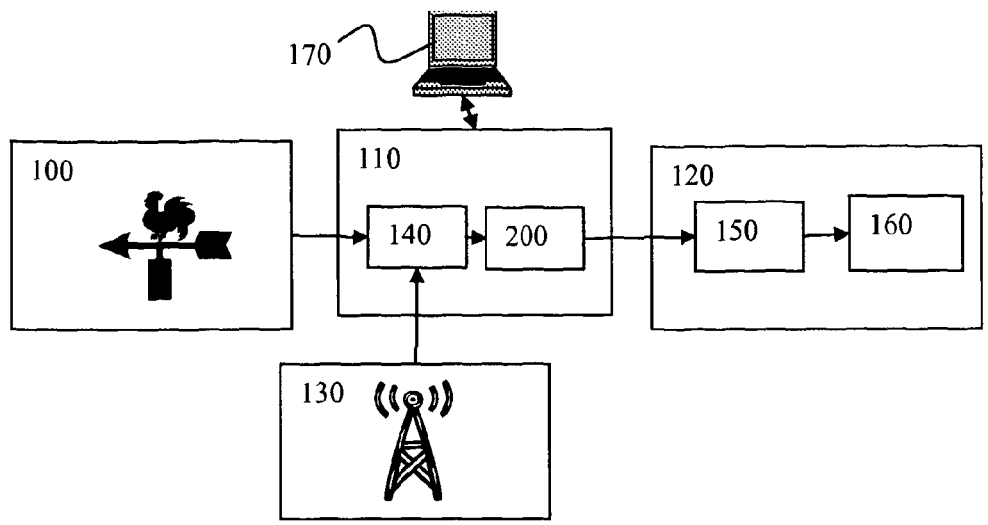
FIG. 3 is another illustration of part of a mobile radio communications network according to another embodiment of the present invention. The figure illustrates another possible implementation by which information may be collated in order to make a projection of the time to likely power outage. The figure also shows in which pieces of equipment the functionality is located for determining and implementing the actions which can be taken in order to mitigate the power outage.

FIG. 3 shows another embodiment with the same functionality as described in FIG. 2, however, the processing function, which decides which traffic management actions should be taken is carried out within the BSC (120). The processing function (200) within the OSS (110) determines whether an alarm should be raised.

It should be noted that the functionality shown implemented within the OSS (110) in FIG. 2 and FIG. 3 may be implemented in a power supply OSS or in the Radio Access Network OSS or across some combination of the two OSS's. It is also conceived that the partial or complete collation of meteorological, power consumption and traffic demand information along with the processing of that information to determine the expected time to power outage could be carried out entirely by the BSC (120). Partial or complete collation of meteorological, power consumption and traffic demand information along with partial or complete processing of that information to determine time to power outage could be carried out entirely at the base site (130).

It is also foreseen that the OSS operative may choose to implement methods for reducing base station power consumption, discussed elsewhere within this invention, even in the absence of projected forthcoming power outage, for example in order to reduce fuel costs. The OSS operative could signal this requirement through the use of the OSS terminal (170).

FIG. 4, FIG. 5, FIG. 6 and FIG. 9 illustrate a number of methods by which the power consumption of the base site is reduced by reducing the number of subscribers in the cell. The reduction in the number of subscribers makes it possible to switch off, for example, baseband processing cards and/or RF processing cards within the BTS thereby reducing power consumption. However, this is done at the expense of reducing call revenue and reducing subscribers' quality and/or grade of service.

Figure 4:
FIG. 4 illustrates a method by which the power consumption of a base site may be reduced by reducing the area over which radio coverage is provided.

FIG. 4 illustrates how the number of subscribers may be reduced by shrinking the size of the cell. This may be achieved, by for example reducing the power of the common control channels which are used by the mobile station in selecting the preferred radio cell.

Figure 5:
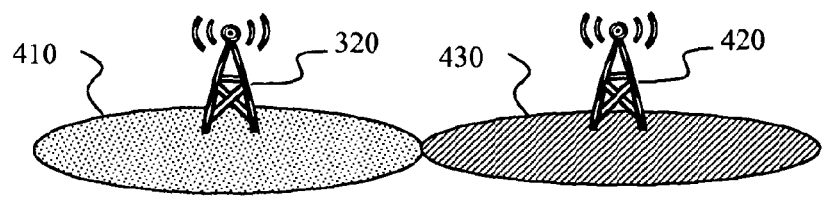
FIG. 5 and FIG. 6 together illustrate another method by which the power consumption of a first base site may be reduced by reducing the coverage of that base site. The coverage of the second base site being increased to accommodate for the reduced coverage of the first base site.
Figure 6:
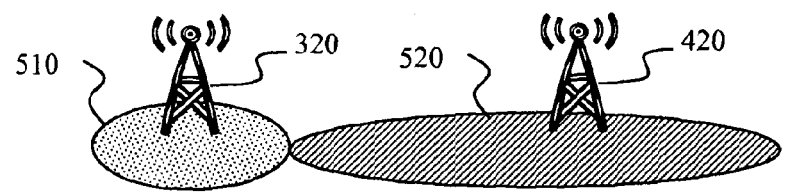

FIG. 5 and FIG. 6 show how the coverage (410) and power consumption of base station (320) could be shrunk from that shown in FIG. 5 (410) to that shown in FIG. 6 (510), whilst at the same time the coverage of one or more other, better powered, base stations (420) is increased to compensate.

Figure 9:
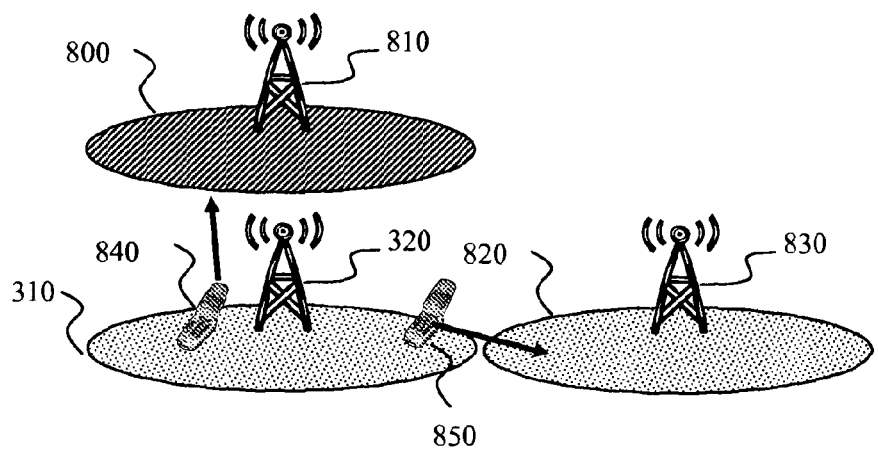
FIG. 9 illustrates another method by which the power consumption of a base site may be reduced by reducing the volume of traffic flowing through that base site through handing over calls to adjacent base sites which are either on the same carrier and same system or which are on different carriers and/or systems.

FIG. 9 illustrates how the number of subscribers managed by base station (320) can be reduced by handing over the calls from base station (320) to other cells. Subscriber (850) is handed over from base station (320) to another base station (830) on the same carrier and on the same network. Alternatively a mobile station (840) may be handed over from base station (320) to another base station (810) which is either on the same system, same network but different carrier or which is on another system and/or network. The modified handover behavior may be achieved by modifying the OSS parameters used in the handover algorithms. In a similar way the likelihood of a call being established on the underpowered base station (320) may be reduced by modification of the OSS parameters which determine cell selection and cell reselection behavior.

Figure 7:
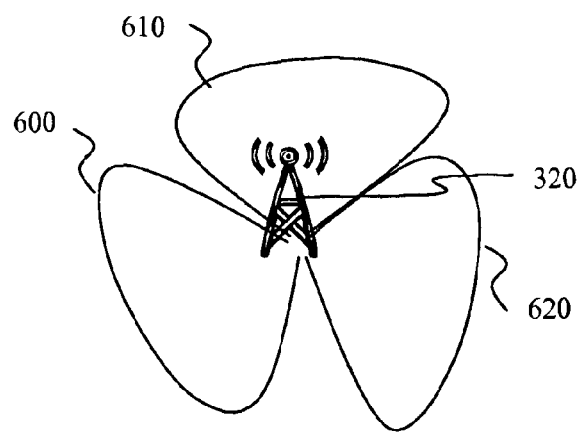
FIG. 7 and FIG. 8 together illustrate another method by which the power consumption of a base site may be reduced by modifying the sectorisation of the base site and trading off a reduction in radio capacity for a reduction in the power consumption of the base site.
Figure 8:
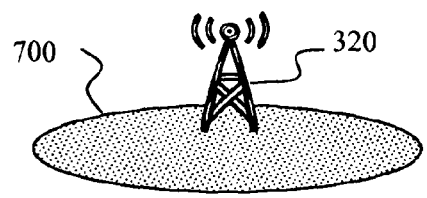

FIG. 7 and FIG. 8 illustrate a way by which the power consumption of base station (320) may be reduced by reducing the number of sectors supported by the base station. FIG. 7 shows a base station (320) which has 3 sectors (600, 610, 620). FIG. 8 shows the base station (320) with no sectorisation, instead having been reconfigured with an omni-directional antenna pattern. Reducing the number of sectors supported can reduce power consumption by making it possible to switch off power amplifiers and or baseband processing circuits. The reduction of the number of sectors will be at the expense of capacity provided. When changing the number of sectors the OSS may need to provide a new cell plan, specifying for example which frequencies are to be used in which cells and what handover/cell selection neighbor list should be provided for each cell. To switch from a multi-sectored configuration to an omni configuration it would be necessary to provision the required antennas for each configuration along with the ability to switch between the different antennas.

Another method by which the number of users may be reduced in a cell is to simply refuse admission onto the cell to users with low priority and/or with low revenue generating capability. This priority information is provided during the admission control process using, for example Allocation/Retention Priority (ARP) information which is provided, for example by the Home Location Register, The ARP information may also be used to select which calls should be dropped when the need to switch off a base station card is urgent. In a similar vein, in some base station designs it may also be the case that it is possible to reduce the number of circuit boards in use by reducing the data rates available to packet calls or to voice calls.

Figure 10:
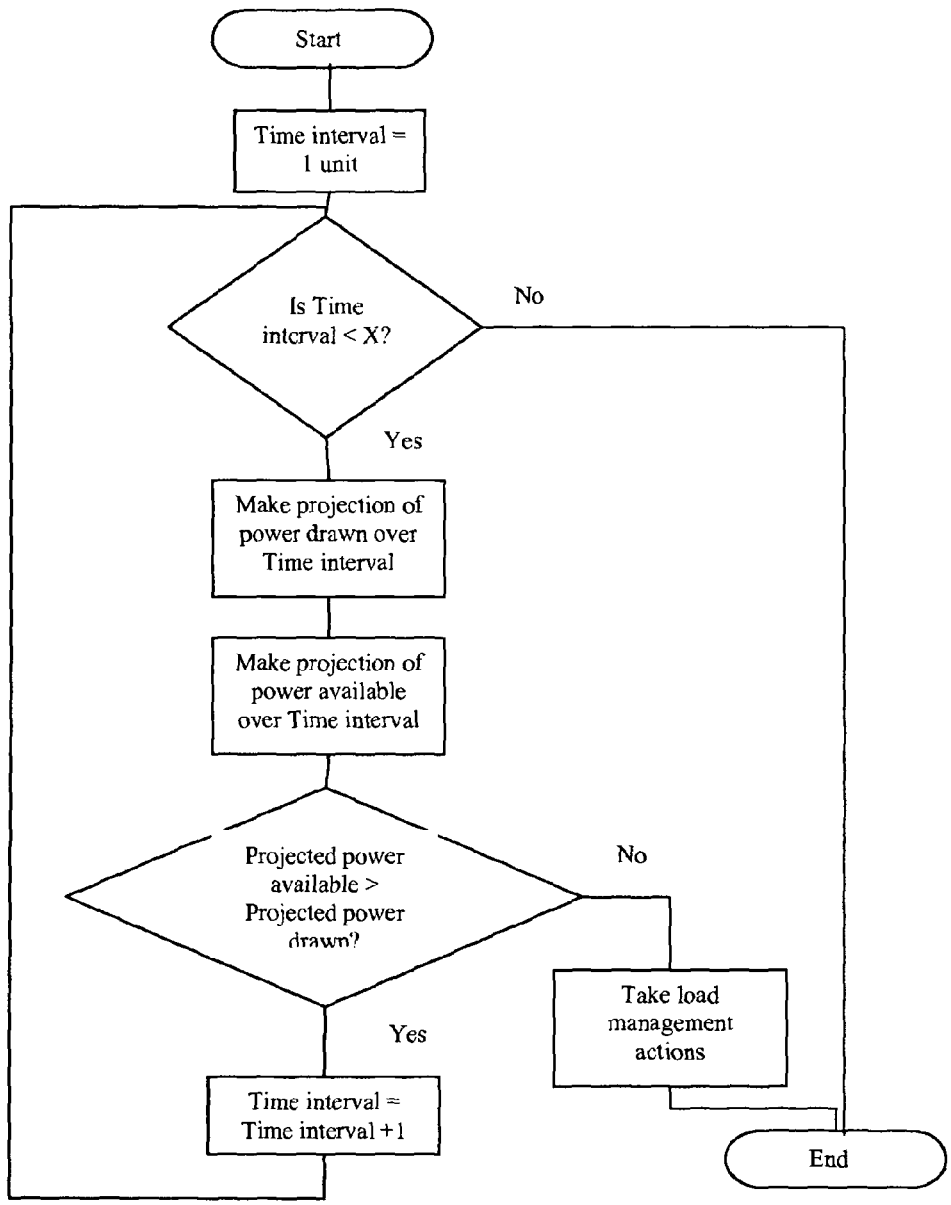
FIG. 10 provides an illustration of a flow chart which illustrates an example algorithm for taking load management actions in response to projected power outage.

FIG. 10 provides an illustration of a flow chart which shows an example algorithm for taking load management actions in response to projected power outage.

There are a number of methods and techniques for computing the likelihood that power outage will occur in some future time interval. One set of methods, an example of which is illustrated in FIG. 10, is based around firstly making a projection of the amount of power which will be available to the site over the given future time interval and secondly making a projection for the amount of power which will be drawn by the site over the same given future time interval. If the difference between the first projection of power available and the second projection of power required is positive then it may be that no load management action is required, however, if the difference is negative then this would indicate the possibility of a future power outage and may therefore be used to trigger load power reduction actions.

The power which is expected to be drawn by the loads over some future period may be derived using historical data gathered under similar conditions to the future period under consideration. Where similar conditions in this regard could include but not be limited to time of day, day of week and day of the year. Such historical values may also be optionally modified to account for any changes in average traffic load between the considered future period and the time of the historical record, brought about for example by changes in subscriber numbers, changes in network usage or changes in tariffs.

The projection of power to be generated by renewable energy sources over some future period may be projected using meteorological information obtained from a 3rd party server which supplies regional weather forecast data. One approach would be to use a table which records the amount of power which is generated under each meteorological condition. For example the table might store the amount of usable power generated by the wind turbine over a range of wind speeds and likewise it might store the amount of power generated by Photo-Voltaic panels over a range of solar insolation values. In this way the projected future meteorological conditions (wind speed, solar insolation) may be used as an index into the table to access the corresponding projection for the power which will be generated under the given meteorological condition. The table contents may be obtained through computation or they may be obtained from historical correlation of measurements of given meteorological conditions and the corresponding measurements of power generated under those conditions. The accuracy of the projection of the future meteorological conditions could be enhanced by making use of measurements of meteorological conditions which are made at the base site. For example, the correlation between historical regional weather forecasts and historical weather measurements made at the site could be used to determine offsets that should be applied to the regional weather forecasts, prior to using the meteorological data in the table look up. The computation of power available may, in addition to considering power generated by renewable energy sources, additionally take into account any energy which is already stored in the battery, any energy which may be produced by a generator given the available fuel supplies and any energy that may be available from the grid.

In the example algorithm illustrated in FIG. 10, the computation of whether or not an outage is expected to occur is carried out for a time period 'Time interval', which is incrementally increased, for example in increments of 6 hours, in each loop of the algorithm. If no power outages are projected for time periods below a predetermined threshold value, 'X' (where for example X=3 days) then the algorithm is terminated and no load management action is taken. If an outage is projected to occur for any time interval less than X, then load management actions will be taken. Note that it is foreseen that a constant multiplier may be applied to either the projection for drawn power or the projection of available power, to provide a margin for projection error.

The time at which load reduction actions are taken may be chosen to coincide with periods when the number of subscribers on the system is typically low and/or when the opportunity for revenue generation is poor. In this way any detrimental effects resulting from the load management actions will affect the lowest number of subscribers and/or will have the minimal impact on profits.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

The invention claimed is:

1. A power management method comprising:
   projecting the likelihood that a power outage will occur at a mobile radio base site over some future interval by using:
      a projection of power that will be available to a mobile radio base station over the future interval; and
      a projection of power that will be consumed by loads at the mobile radio base site over the future interval, the likelihood of the power outage being determined by whether or not projected available power is greater than projected consumed power; and
   in the event that the power outage is expected, invoking actions to prolong a period for which the mobile radio base station at the mobile radio base site provides service.

2. The power management method of claim 1, in which the action invoked is to raise an alarm on an Operational Support System.

3. The power management method of claim 1, in which the action invoked is to reduce power requirements of the mobile radio base site.

4. The power management method of claim 3, in which the action invoked is to reduce traffic being carried in a cell.

5. The power management method of claim 4, in which the traffic in the cell is reduced by shrinking a coverage area of the cell to establish a reduced coverage area.

6. The power management method of claim 5, in which the reduced coverage area is compensated by an increase in the coverage area provided by adjacent cells.

7. The power management method of claim 4, in which the traffic in the cell is reduced by modifying handover OSS parameters to encourage a handover of traffic to other base stations on a same system as the mobile radio base station.

8. The power management method of claim 4, in which the traffic in the cell is reduced by modifying handover OSS parameters to encourage the handover of traffic to base stations on a different system.

9. The power management method of claim 4, in which the traffic in the cell is reduced by modifying cell selection parameters of the mobile radio base station and of other base stations in a vicinity.

10. The power management method of claim 4, in which the traffic in the cell is reduced by modifying cell re-selection parameters of the mobile radio base station and of other base stations in a vicinity.

11. The power management method of claim 1, in which the action invoked is to reduce a number of sectors supported by the mobile radio base station.

12. The power management method of claim 1, in which the action invoked is to prevent admission to the cells under the control of the mobile radio base site for calls with low priority.

13. The power management method of claim 1, in which the action invoked is to drop low priority calls in the cells under control of the mobile radio base site.

14. The power management method of claim 1, in which the action invoked is to reduce a data rate supported for services in cells under control of the mobile radio base site.

15. The power management method of claim 1, where the expectation of the power which will be consumed by the base station site equipment over some future period is derived using historical data gathered under similar conditions, where similar conditions could include but not be limited to time of day, day of week and day of the year.

16. The power management method of claim 1, where the expectation of power to be consumed is derived from historical values which have been optionally modified to account for any changes in average traffic load between the considered future period and a time of a historical record, brought about by changes in subscriber numbers, changes in network usage or changes in tariffs.

17. The power management method of claim 1, wherein the projection of power to be available comprises power available from renewable energy sources over some future period which is calculated by taking into account meteorological information obtained from a weather station situated at the cell site.

18. The power management method of claim 1, wherein the projection of power to be available comprises power available from renewable energy sources over some future period which is calculated using meteorological information obtained from a 3rd party server which supplies weather forecast data.

19. A power management method according to claim 17, wherein localized weather data, collected from weather stations collocated with base stations is used to enhance regional weather forecasts collected from meteorological information servers.

20. A power management method according to claim 1, wherein the invoked actions are scheduled to take effect during low subscriber usage periods or during low revenue generation periods.

21. The power management method of claim 4, in which the reduction in traffic being carried in the cell enables one or more electronic circuits in the mobile radio base station to be switched off.

* * * * *